W. Cameron,

Tobacco Press,

No. 1,127. Reissued Jan. 15, 1861.

Witnesses:
J. Cohen
J. Hirsh

Inventor:
William Cameron,
per atty
W. B. Stoughton.

AM. PHOTO-LIT'HG. CO. N.Y. (OSBORNE'S PROCESS)

UNITED STATES PATENT OFFICE.

WILLIAM CAMERON, OF PETERSBURG, VIRGINIA.

IMPROVEMENT IN TOBACCO-PRESSES.

Specification forming part of Letters Patent No. 22,014, dated November 9, 1858; Reissue No. 1,127, dated January 15, 1861.

*To all whom it may concern:*

Be it known that I, WILLIAM CAMERON, of Petersburg, in the county of Dinwiddie and State of Virginia, have invented certain new and useful Improvements in Machinery for Pressing Tobacco; and I do hereby declare the following to be a full, clear, and exact description of the construction and operation of the same, reference being had to the accompanying drawings, making a part of this specification, in which—

Figure 2:
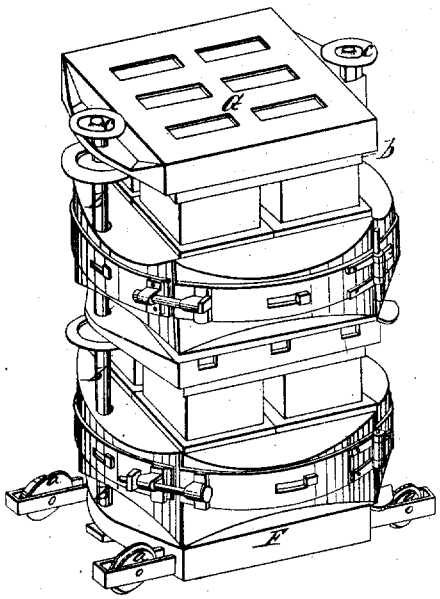
Figure 1:
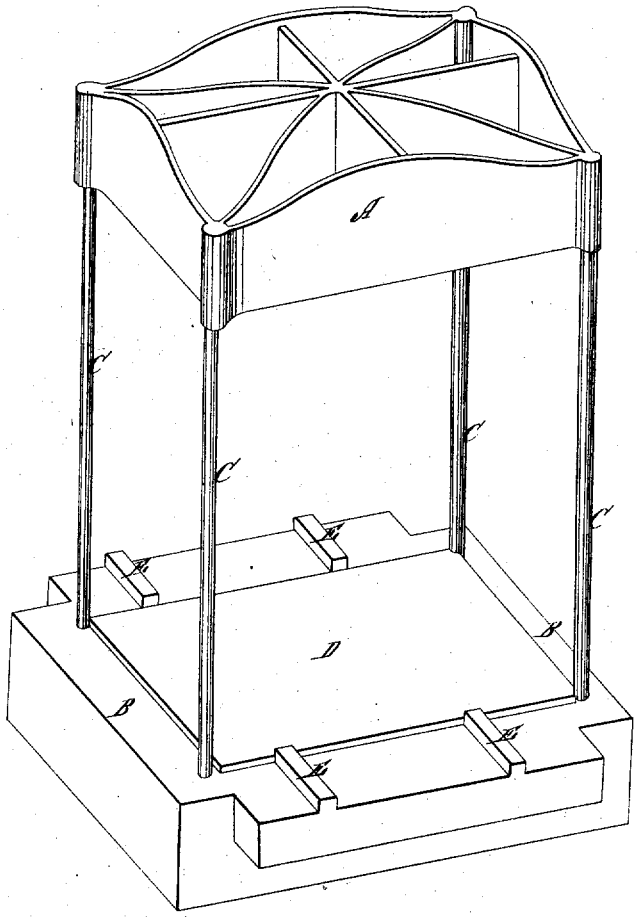

Figure 1 represents a perspective view of a hydraulic press; and Fig. 2 represents in perspective a pile or series of boxes, segmental rings, retaining-bars, and their several connections and appliances, forming a secondary and retaining press to be used in connection with the hydraulic press.

In the use of a major and minor press for pressing tobacco it is necessary that the greater press should have very great power, and to procure such requisite power by the ordinary appliances of levers, or their equivalents, takes up much room in the building where the work is carried on, and requires great exertion to work such a press.

My object is to construct and use a powerful press, in connection with a retaining-press, as that the whole shall be compact, cheap, and very powerful and efficient, and requiring but little exertion, even when operated by hand, to generate an immensity of pressure.

I am aware that a hydraulic press in itself is not new; but a hydraulic press so arranged as to receive a retaining-press, impart its power to the retainer, and allow the retainer to be moved away, carrying the capacity of the hydraulic press, as regards power, with it, has never been done prior to my invention. It is not the mere putting together of two well-known things to obtain only a common result, for each must be made with a view to impart to and receive from the other, and their joint product creates an element in the retainer or secondary press which it does not possess and cannot create within itself. A hydraulic press is the most powerful known press, requires but little room and little power to work it. Its peculiar adaptation to the purpose of pressing tobacco is great; but would not be so valuable, however powerful and cheap it might be, to hold or retain the pressure, as they are apt to leak, particularly under heavy pressure. In the use, then, of a hydraulic press in connection with a retainer I get more power, occupy less room, require less labor or power to operate the press, and put the tobacco into a better condition for preservation, than by any other kind of press known or used prior to my invention in connection with a stand or retaining-press, it being a well-known fact that the more compact the tobacco is pressed the better it will keep. A hydraulic press had not been used successfully in the pressing of tobacco, because it would not hold the pressure for any length of time, owing to the practical impossibility of so packing it as to remain tight under ponderous pressure, and it was necessary that the tobacco should so remain for a length of time under the pressure until it was set in its compressed form. By combining with the hydraulic press a retaining-press that would hold the power generated by the hydraulic press I have made that kind of press available to the pressing of tobacco, which it was not before. On the other hand, I make a cheap and light retaining-press, which, though not capable of creating any very great power within itself, will hold and retain that which the hydraulic press could create, but would not hold, and thus I not only give, as it were, a new function to the hydraulic press, but also a new one to the retaining-press, by their mutually imparting to each other the benefits which they individually do not possess or could not maintain. This, then, is what I have done: I have shown how a hydraulic press may be advantageously applied to the pressing and holding under continued pressure tobacco—a thing not heretofore known. The power of the hydraulic press was known and was desirable; but how to hold and preserve that power by efficient and simple means for a length of time was not known.

My invention, therefore, consists in the combination of a hydraulic press for generating great power with a cheap retaining-press or stand that will receive and hold said power when imparted to it by the hydraulic press, this combination affecting many benefits not heretofore known in the pressing of tobacco.

To enable others skilled in the art to make and use my invention, I will proceed to describe how I have reduced it to practice.

A and B may represent the top and base of a hydraulic press firmly tied to each other by rods or pillars C, and sufficiently rigid for resisting very heavy pressure.

D may represent the follower of the press, which is forced by the pump toward the stationary part of the press. I prefer to make the press vertical, and to drive the follower from the bottom toward the top of the press, as seen in the drawings.

E E are ways upon which the stand or retaining-press that is to be used in connection with this more powerful press is run onto or off from the follower D or floor of the press.

In Fig. 2 I have represented a retaining-press or stand built upon a base, F, furnished with wheels *a a*, by which it may be transported to, under, and from the hydraulic press. This retainer or stand is composed of a series of plates, blocks, or pressing-boards, between which the tobacco to be pressed is placed. The top and bottom plates, G F, are united by rods *b b*, having nuts or hand-wheels *c c*, or other equivalent mechanical contrivances upon them, by which the top plate may be raised and lowered, and which will retain the pressure put upon this stand by the hydraulic press. When this stand is properly built up with the tobacco in place, and the whole tightened up, it is run under the hydraulic press, where the power of that press is transmitted to it, and when sufficient the nuts *c c*, or their equivalents, are run down and retain it there. The stand with the pressure upon it is then run off upon the ways E E, and another may take its place. The hydraulic press would not (owing to the impossibility of packing it so as to remain perfectly tight without too much friction) hold this pressure, but the retainer will, and by the use of an adjunct in the way of an auxiliary light press, I can thus use a hydraulic press in the pressing of tobacco with great advantage and economy in room, in labor, in expense, and in the production of an article in better condition for preservation than by any other known means.

Having thus fully described the nature and object of my invention, what I claim under this patent is—

The making of a hydraulic press available in the pressing and retaining under pressure of tobacco by combining and using in connection with it a retaining press or stand that will receive and hold the pressure imparted to it by the said hydraulic press, substantially as herein described.

WILLIAM CAMERON.

Witnesses:

ROBERT CRAWFORD,

GEORGE CAMERON.